No. 775,875. PATENTED NOV. 22, 1904.
L. VILLATTE.
ROLLER BEARING.
APPLICATION FILED JULY 25, 1904.
NO MODEL.
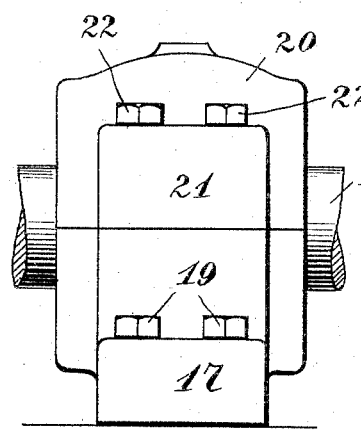
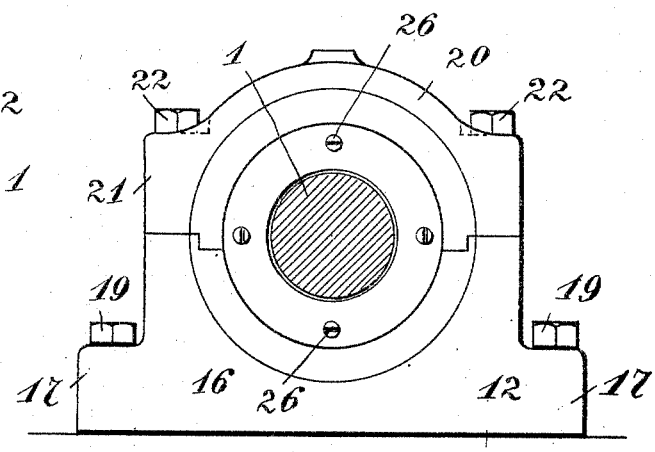
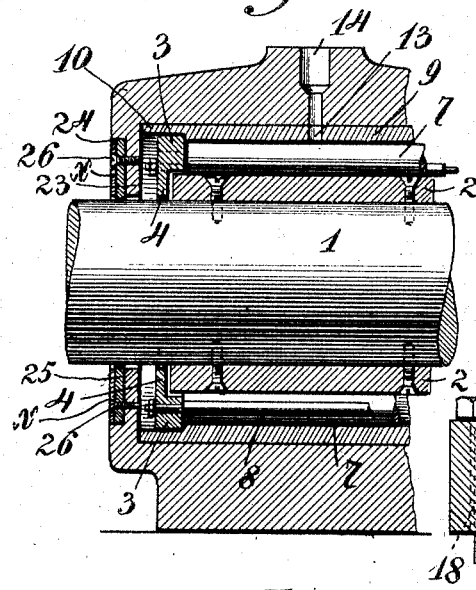
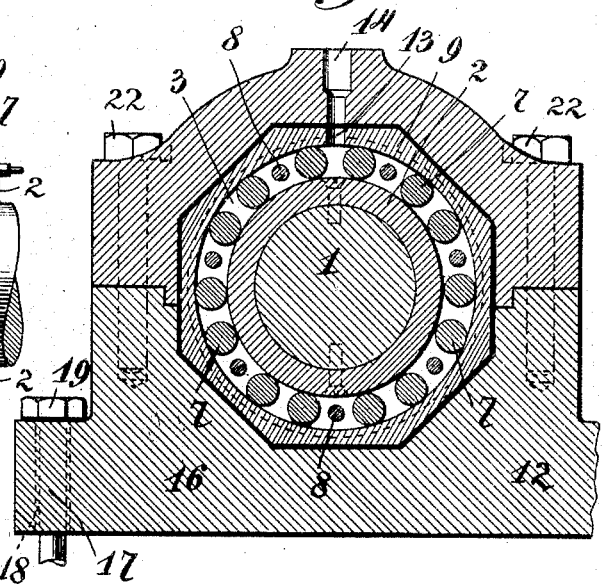
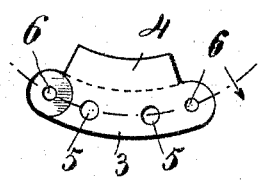
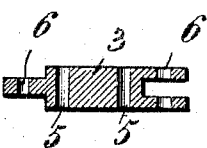
Witnesses
C. Munker
C. H. Griesbauer
Inventor
Louis Villatte
by H. B. Willson
Attorney No. 775,875. Patented November 22, 1904.

UNITED STATES PATENT OFFICE.

LOUIS VILLATTE, OF WATERTOWN, NEW YORK.

ROLLER-BEARING.

SPECIFICATION forming part of Letters Patent No. 775,875, dated November 22, 1904.

Application filed July 25, 1904. Serial No. 217,985. (No model.)

*To all whom it may concern:*

Be it known that I, LOUIS VILLATTE, a citizen of the United States, residing at Watertown, in the county of Jefferson and State of New York, have invented certain new and useful Improvements in Roller-Bearings; and I do declare the following to be a full, clear, and exact description of the invention, such as will enable others skilled in the art to which it appertains to make and use the same.

This invention relates to improvements in roller-bearing journal-boxes for shafts.

The object of the invention is to provide a bearing of this character in which friction of the parts will be reduced to a minimum, means being provided for preventing wear upon the shaft and means whereby the parts will be self-lubricating.

With this object in view the invention consists of certain novel features of construction, combination, and arrangement of parts, as will hereinafter be more fully described, and particularly pointed out in the appended claims.

In the accompanying drawings, Figure 1 is a side elevation of a bearing constructed in accordance with the invention. Fig. 2 is an end elevation of the same. Fig. 3 is a central vertical longitudinal sectional view. Fig. 4 is a transverse sectional view. Fig. 5 is a detail view of one of the links which form the roller-supporting rings, and Fig. 6 is a sectional view of the same.

Referring more particularly to the drawings, 1 denotes the shaft, to which is secured a hardened-steel sleeve 2. Said sleeve may be secured to the shaft 1 in any suitable manner, but is preferably fixed to the same by means of countersunk machine-screws, as shown.

On each end of the sleeve 2 are arranged bearing-rings 3, through which the shaft 1 is adapted to pass. The rings 3 are provided on their inner sides with annular flanges 4, which are adapted to fit over the ends of the sleeve 2, thereby forming caps. In the rings 3 are formed a series of bearing-apertures 5 and bolt-holes 6. The bearing-apertures 5 are preferably arranged in pairs, and between each two pairs is disposed a bolt-hole 6. Journaled in the bearing-apertures 5 are antifriction-rollers 7, the ends of which are reduced where they enter said bearing-apertures, so that a shoulder is formed on said rollers, thereby preventing any longitudinal shifting movement of the same. Through the bolt-holes 6 are passed the ends of clamping-bolts 8, said ends being reduced, thereby forming shoulders on said bolts which are engaged by the inner edges of the rings 3. Nuts are applied to the outer ends of said bolts, thereby clamping the same and said rings firmly in place. The rings 3 and rollers 7 are incased within a hardened-steel box 9, the inner surface of which forms an annular bearing for said rollers and in which the same are adapted to turn with the rotation of the shaft 1. The inner diameter of the box 9 near each end of the same is enlarged, as shown at 10, whereby the bearing-rings 3 may be accommodated. The box 9 is preferably octagonal in shape on its outer side and is adapted to fit within an octagonal-shaped opening in a pedestal or support 12. In one side of said box is formed an oil-hole 13, which is arranged in line with an oil-hole, 14, formed in said pedestal and above which and in communication therewith is arranged an oil-cup which may be of ordinary or any suitable construction.

The pedestal 12 is preferably formed of a lower base-section 16, having laterally-projecting flanges 17, which are provided with vertically-disposed bolt-holes 18, through which may be passed bolts 19, whereby the same may be secured to a floor or other support.

The upper portion of the pedestal 12 is preferably in the form of a cap 20, having laterally-projecting flanges 21, in which are formed vertically-disposed bolt-holes for the reception of bolts 22, which are adapted to be screwed into threaded apertures in the base portion of said pedestal, thereby securing the parts of the same together.

On each end of the pedestal 12 are formed inwardly-projecting annular flanges 23, the upper faces of which are recessed, as at 24, to receive a packing-ring 25, the inner edge of which is adapted to closely engage the periphery of the shaft 1, thereby preventing the entrance of dirt, chips, sawdust, or other foreign matter and also preventing the spattering or splashing out of any of the lubricating-oil from the inner side of the bearing. On the packing-ring 25 is arranged a circular metal holding-ring x, which is adapted to be secured to the flanges 23 by means of screws 26, thereby securely holding the packing-ring 25 in place and in engagement with the shaft.

The rollers 7 are adapted to be lubricated by means of oil passing from the oil-cup 15, through the alined oil-holes 13 and 14, into the space within the box 9 in which said rollers are located and which passes to the lower side of said box, where it may stand and through which each roller must pass as the same is revolved, thereby immersing or bathing said rollers in the oil at each revolution of the shaft, thus keeping the parts well lubricated.

In a roller-bearing constructed as herein shown and described it will be seen that the friction will be taken up by the rollers 7, thereby preventing or materially decreasing the wear of the parts.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a journal-box, the combination, with a shaft and a sleeve secured thereto, of cap-rings each having a curved flange to fit over the end of the sleeve, and each having formed therein bearing-apertures and bolt-holes in the enlarged outer portions of said rings, antifriction-rollers journaled in said bearing-apertures, bolts extending from one ring to the other and through the bolt-holes to connect the rings together, said bolts being located intermediate two pairs of rollers, a box surrounding the rollers to form the outer bearing therefor, and a pedestal to receive and support the box, substantially as described.

2. In a journal-box, the combination, with a shaft and a sleeve secured thereto, of cap-rings formed of sections and surrounding the shaft at the ends of the sleeve, each cap-ring section having a curved flange to fit over the end of the sleeve and an enlarged portion having formed therein bearing-apertures and bolt-holes, antifriction-rollers journaled in the bearing-apertures, bolts extending through the bolt-holes and connecting the ring-sections at opposite ends of the sleeve, a box surrounding said sleeve and rollers and a pedestal to support the bearing, substantially as described.

In testimony whereof I have hereunto set my hand in presence of two subscribing witnesses.

LOUIS VILLATTE.

Witnesses:
 JOHN U. CARLISL,
 DICKINSON E. GRIFFITH.